United States Patent [19]

Blanks

[11] Patent Number: 5,231,556
[45] Date of Patent: Jul. 27, 1993

[54] SELF-HOLDING LATCH ASSEMBLY

[75] Inventor: John B. Blanks, Edmond, Okla.

[73] Assignee: Seagate Technology, Inc., Scotts Valley, Calif.

[21] Appl. No.: 711,311

[22] Filed: Jun. 6, 1991

[51] Int. Cl.⁵ .................................. G11B 21/22
[52] U.S. Cl. ........................................ 360/105
[58] Field of Search ........................... 360/105

[56] References Cited

U.S. PATENT DOCUMENTS

| | | | |
|---|---|---|---|
| 4,764,831 | 8/1988 | Patel | 360/105 |
| 4,796,130 | 1/1989 | Shimanuki | 360/105 |
| 4,807,072 | 2/1989 | Ono et al. | 360/105 |
| 4,864,444 | 9/1990 | Liu et al. | 360/105 |
| 4,868,695 | 9/1989 | Quatro et al. | 360/105 |
| 4,881,139 | 11/1989 | Hazebrouck | 360/105 |
| 4,903,157 | 2/1990 | Malek | 360/105 |
| 4,985,793 | 1/1991 | Anderson | 360/105 |

Primary Examiner—Robert S. Tupper
Attorney, Agent, or Firm—Edward P. Heller, III; Bill D. McCarthy; Louis W. Watson

[57] ABSTRACT

A self-holding latch assembly for a disc drive storage device to alternately lock or unlock the actuator of the disc drive storage device, the latch assembly including a magnet coil means supported in a predetermined spatial relationship to the actuator for alternately providing magnetic attraction to a first limit stop or to a second limit stop in response to current flow therethrough. A magnet latch assembly is pivotally supported by the magnet coil means and is alternately attracted to the first limit stop or to the second limit stop, the magnet latch assembly having engagement with the actuator for locking same in one such position, and being in clearing relationship to the actuator in the other stable position.

9 Claims, 4 Drawing Sheets

PRIOR ART

SELF-HOLDING LATCH ASSEMBLY

BACKGROUND OF THE INVENTION

1. Field of the Invention

This invention relates generally to the field of disc drive data storage devices and more particularly, but not by way of limitation, to an improved latch assembly for selectively locking the read/write heads of a disc drive in a fixed location.

2. Brief Description of the Prior Art

Disc drives of the type known as "Winchester" disc drives are well known in the industry. These disc drives include a number of rigid discs mounted for rotation on a spindle motor. The surface of the discs is coated with a magnetically permeable medium on which digital information is recorded and from which this information is later retrieved. This information is usually recorded on the discs in a number of circular, concentric data tracks.

Data recording and retrieval of information from the discs is accomplished with read/write heads, each of which is typically associated with, and arrayed in close proximity to, one surface of a disc. These read/write heads are commonly in the form of an interrupted ferrous ring wrapped with wires or an analogous form fabricated using thin-film deposition techniques. To record data, controlled timed current pulses are applied to the wires, inducing magnetic flux in the ferrous ring, or core. At the point where the core is interrupted, or the gap, this flux extends beyond the limits of the core to magnetize the adjacent recording medium. Retrieval of this information is accomplished when the spinning disc brings the previously recorded data under the gap of the head. This induces current spikes in the wires which are amplified and passed to electronic read data logic.

The read/write head is integrated into a slider which incorporates an arrangement of ski-like features on the side of the slider body closest to the disc surface. Before power is applied to the disc drive, the slider is in contact with the disc. Upon the application of power, the discs begin to spin, dragging along a thin layer of air. At some point in the acceleration of the disc as the disc is increased in rotational velocity to achieve to operational speed, the ski-like features on the slider interact with this layer of air to fly the heads above the disc surface on an air bearing. This air bearing serves to minimize wear and lessen the power needed to move the heads across the disc surface.

In order for the single head associated with each disc surface to access all of the data tracks, the read/write heads are mounted on an actuator assembly which includes a motor under control of additional logic. This actuator mechanism moves the heads from track to track in a controlled manner.

In the earliest rigid disc drives employed in personal computers, the motor used in the actuator assembly to move the heads was typically a stepper motor. The design of stepper motors results in a significant magnetic detent which tends to hold the stepper motor in the position to which it was last driven. This feature was utilized to hold the heads in whatever location they occupied upon loss of power and is known as a "random parking" scheme.

The need for faster access to data led the industry to employ voice coil motors (VCMs) in the actuator assembly. Voice coil motors employ the same technology used in loud speakers, that is, an electrical coil and a permanent magnet whose interacting magnetic flux fields result in rapid, controllable movement. While the use of VCMs has resulted in very rapid data access times, often less then ten milliseconds, the VCM has no inherent detent, or holding capability, when power is removed. This fact has given rise to the standard practice of moving the read/write heads to a designated "parking zone" when the loss of power is detected, and mechanically latching the actuator assembly in the parking zone until power is restored.

Most often the parking zone is at an inner area of the discs closely adjacent the spindle motor, that is, in an area where no data are recorded, in order to minimize the starting torque requirement of the spindle motor. Because the heads rest in contact with the disc surfaces when power is removed, the parking zone is sometimes referred to as a "landing zone". Latching the actuator assembly when the read/write heads are at the landing zone prevents relative motion of the heads and discs when in contact in order to minimize the risk of damage to either of these critical components.

Latching assemblies have been designed in many forms. Some have employed spring biased arms which contact specially formed striker surfaces on the moving actuator when the actuator moves the heads to the parking zone. Typically, the spring bias must then be overcome to unlatch the actuator at power on. The methods used to overcome this spring bias have included solenoids, and air vanes which are moved by air currents formed when the discs begin to spin.

Other latch assemblies have been designed using permanent magnets fixed on a stationary portion of the disc drive which contact a magnetizable striker surface on the moving actuator. In such latch assemblies the actuator motor is frequently employed to overcome the latching force when power is restored. Such an arrangement requires a careful compromise between the latching force of the magnet and the available power of the actuator motor. If the magnetic latching force is too great, the motor may not be able to overcome it, and if the latching force is too small, the actuator may not stay latched under specified mechanical shock loads. Furthermore, this type of latch can introduce a bias to the actuator when the disc drive is accessing the data tracks closest to the parking zone.

Mechanical latches which use solenoids have also been employed to unlatch the actuator. Generally, such mechanical latches require that power be continuously supplied to the solenoid to keep the latch open during normal operation. Industry demands for low-power disc drives normally preclude the use of this type of latching assembly.

Many of the prior art latches require that precise adjustments be made when the latch is installed into the disc drive to insure proper operation. This precision adjustment not only adds to the time required to install the latch, but a failure to adjust the latch properly can result in improper operation of the latch, leading to costly rework.

Clearly, the need exists for a latch assembly that does not introduce any mechanical bias to the operation of the actuator assembly and that does not require power to maintain the latch assembly in an open, or unlatched, condition during normal operation.

SUMMARY OF THE INVENTION

The present invention provides a self-holding latch assembly which requires power only to move the latch assembly from a latched position to an unlatched position, or from the unlatched position to the latched position. The latch assembly comprises a magnet coil assembly which is supported in a predetermined spatial relationship to the actuator of a disc drive storage device in which the actuator supports a head for recording/retrieving data to/from a rotatable storage disc. The magnet coil assembly provides first and second limit stops which are magnetically oriented at first and second stable positions in response to current flow and direction of the current in the magnet coil assembly.

A magnet latch assembly is pivotally supported by the magnet coil assembly and serves to engage or disengage the actuator to ultimately lock or free the actuator. The magnet latch assembly is magnetically attracted to the first limit stop or to the second limit stop by selected direction of current flow through the magnet coil assembly. Movement of the magnet latch assembly is effected only in response to a change in the direction of current flow through the magnet coil assembly, and in absence of any current flow therethrough, the magnet latch assembly remains in its last position, either at the first limit stop or at the second limit stop.

It is an object of the present invention to provide a latch assembly for the actuator of a disc drive under control of electronic logic that requires the application of power only during the latching and unlatching operation.

Another object of the invention is to provide a latch assembly for the actuator of a disc drive that does not introduce mechanical bias to the actuator mechanism.

Another object of the invention is to provide a latch assembly for the actuator of a disc drive that has a selectable latching force.

Another object of the invention is to provide a latch assembly for the actuator of a disc drive that requires no precise adjustment at the point of manufacture.

A further object of the invention is to provide a latch assembly for the actuator of a disc drive that is inexpensive to manufacture.

Other objects, features and advantages of the present invention will become apparent to those skilled in the art from a reading of the following detailed description when read in conjunction with the drawings and appended claims.

DETAILED DESCRIPTION OF THE INVENTION

Figure 1:
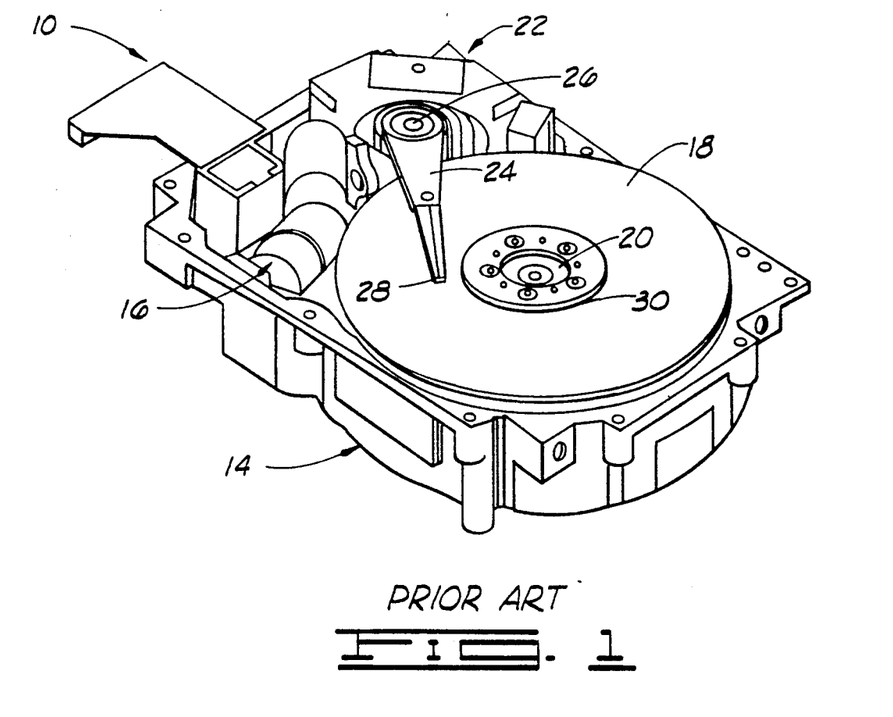
FIG. 1 is a perspective view of a disc drive (top cover not shown) in which the present invention would be particularly useful.

Referring to the drawings generally, and specifically to FIG. 1, a portion of a typical disc drive data storage device 10 is shown. The disc drive data storage device 10 has a base 14 sealed by a top cover (not shown) that has been removed to show the internal components of the storage device 10. A head disc assembly 16 (sometimes referred to as an HDA) is shown of the type known as a rotary voice coil disc drive, and subsequent discussions will use this type of disc drive as an example. However, it should be understood that the present invention is not limited to a rotary voice coil disc drive, and other disc drives employing a linear actuator and any other type of actuator motor can be employed.

Figure 2:
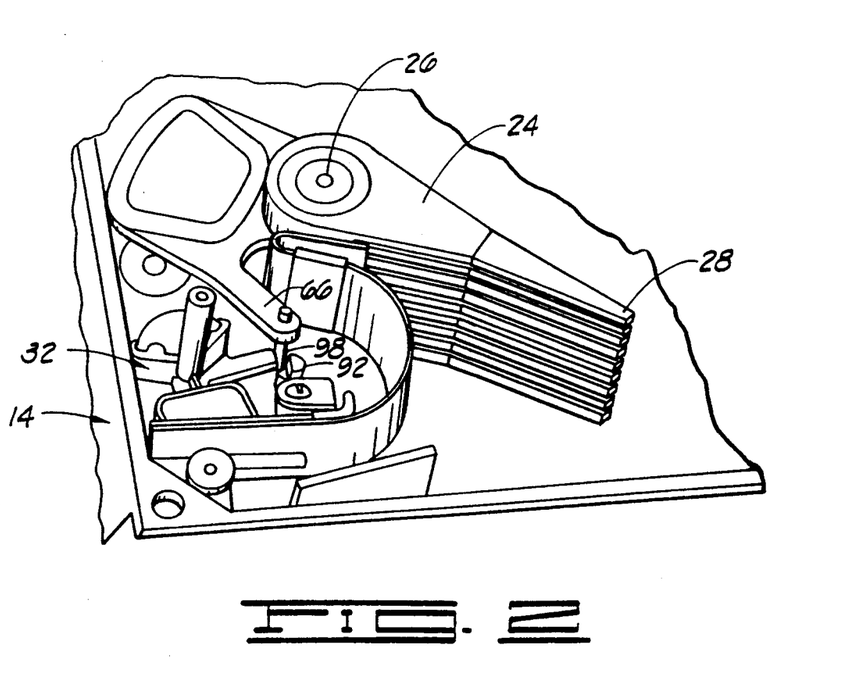
FIG. 2 is a perspective view of the latch assembly of the present invention shown in the locked or latched position.
Figure 3:
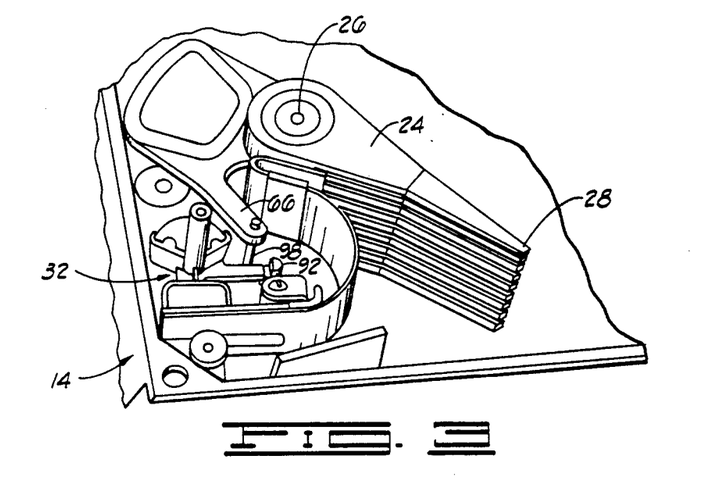
FIG. 3 is a perspective view of the latch assembly of the present invention shown in the unlocked or unlatched position.

The head disc assembly 16 comprises at least one disc 18, and usually several such discs, mounted for rotation on a spindle motor 20. An actuator assembly is provided, comprising an actuator motor 22 (shown in partial detail) which serves to move an actuator 24 about a pivot shaft 26, thus causing a plurality of read/write head assemblies 28 mounted to the actuator 24 to move across, or in near proximity to, the surfaces of the discs 18. An area closely adjacent the spindle motor 20 has been set aside as a parking zone 30 (sometimes also referred to herein as a landing zone). This parking zone 30 is the area to which the read/write head assemblies 28 will be moved at the loss of electrical power to the disc drive data storage device 10, accomplished when electronic circuitry (not shown) detects the loss of power. Upon detection of power loss, the back EMF of the spindle motor 20 causes the actuator motor 22 to rotate the actuator 24 into its most counterclockwise position in a manner well known in the industry. The actuator 24 is secured in its most counterclockwise position by a latch assembly, which, in the present disclosure, is a latch assembly 32 as shown in FIGS. 2 and 3 and constructed in accordance with the present invention.

The precise location of the latch assembly 32 relative to the actuator 24 is important in determining the efficacy of a latch design. Many prior art latches require that precise adjustment of the latch be accomplished at the point of manufacture. This adds to the complexity and cost of manufacture, as well as it introduces the possibility of misalignment. The latch assembly 32 of the present invention incorporates a simple, precise mounting of the latch assembly 32 relative to the actuator 24 that does not require adjustment during installation and thus greatly facilitates the manufacturing process.

Figure 4:
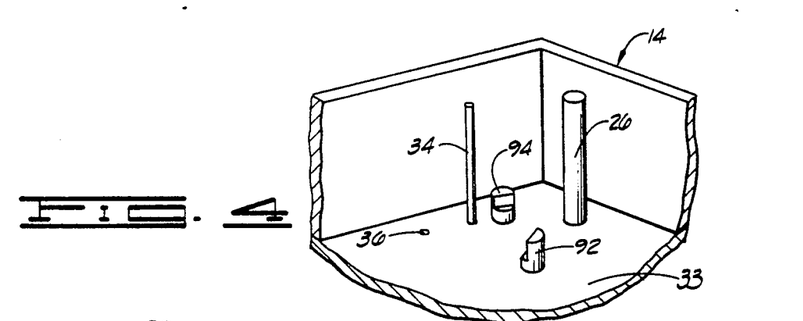
FIG. 4 is a cutaway, partially detailed perspective view of a disc drive, showing the features used to precisely locate the latch assembly of the present invention within the disc drive.

The base 14 of the disc drive data storage device 10 is shown in FIG. 4 together with the actuator pivot shaft 26 for the actuator 24 extending from a base wall 33 thereof. The location of the actuator pivot shaft 26 on the base 14 is precisely determined relative to the position of the spindle motor 20 to establish the exact relationship between the read/write head assemblies 28 and the discs 18. A pivot pin 34 and a threaded hole 36 are also provided as shown in FIG. 4. The pivot pin 34 is supported by the base 14, and together with the threaded hole 36, is used to position, mount and secure the latch assembly 32 in a manner to be discussed below. The exact locations of the pivot pin 34 and the threaded hole 36 are determined at the time the base 14 undergoes fabrication. Also shown in FIG. 4 is a pair of travel stops which will be discussed hereinbelow.

The latch assembly 32 of the present invention consists of two major assemblies: (1) a magnet coil assembly 38; and (2) a magnet latch assembly 40. The magnet coil assembly 38 and the magnet latch assembly 40 will be described in detail hereinafter, as will the relationship thereof to each other.

Figure 5A:
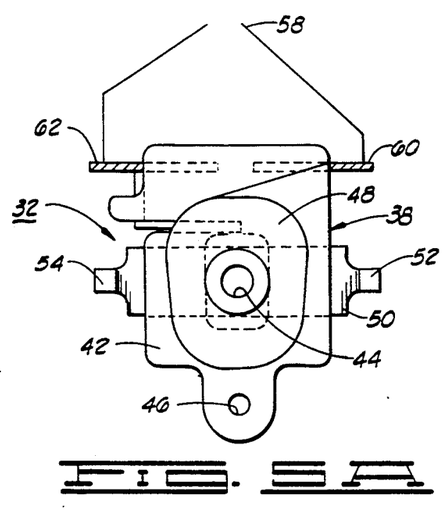
FIGS. 5A and 5B are plan and side views, respectively, of the magnet coil assembly of the latch assembly shown in FIGS. 2 and 3.
Figure 5B:
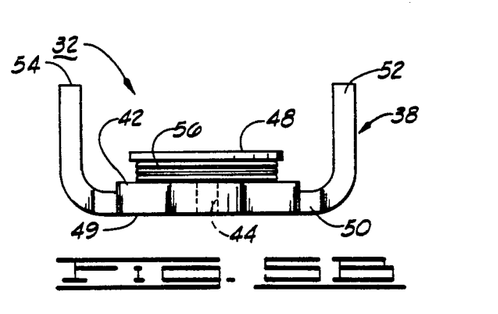

FIGS. 5A and 5B show plan and side views, respectively, of the magnet coil assembly 38 of the latch assembly 32. The magnet coil assembly 38 comprises a baseplate 42, made of plastic or other non-magnetic material, which has a mounting hole 44, a pivot pin hoe 46, a coil form 48, and a notch (not shown) in undersurface 49 thereof.

The mounting hole 44 is dimensioned to receive a screw (not shown) having a complementary head for attaching the magnet coil assembly 38 of the latch assembly 32 to the base 14. The pivot pin hole 46 of the baseplate 42 is dimensioned and located to receive the pivot pin 34 which is supported by the base 14.

The notch in the undersurface 49 of the baseplate 42 is dimensioned and located to receive a lower pole piece 50 of the magnet coil assembly 38. The notch of the baseplate 42 on the undersurface 49 of the baseplate 42 allows the lower pole piece 50 to be positioned between the baseplate 42 and the base 14 when the magnet coil assembly 38 is secured to the base 14. The lower pole piece 50 is made of steel or other magnetically permeable material. The lower pole piece 50 is formed into a U-shaped profile so that two limit stops 52, 54 extend upwardly from the base 14 to define the range of motion of the magnet latch assembly 40, as will be explained below. The magnet coil assembly 38, as will become clear below, is supported in a predetermined spatial relationship to the actuator 24 for the provision, alternately, of first and second limit stops 52, 54 which are selectively magnetized in response to electric current flow.

The coil form 48 of the baseplate 42 is supported above the lower pole piece 50 on the upper side of the baseplate 42. Conductive wire is wound on the coil form 48 in multiple turns to form a coil 56 with terminating wires 58 extending out for connection to the electronic control logic (not shown) for the latch assembly 32. Conductive pins 60, 62 are partially embedded in the baseplate 42 to support the terminating wires 58 and to facilitate soldering.

In securing magnet coil assembly 38 to the base 14, the lower pole piece 50 is disposed in the notch of the baseplate 42 of the magnet coil assembly 38 and the magnet coil assembly 38 is positioned on the base 14 with the pivot pin 34 extending through the pivot pin hole 46. A screw (not shown) is inserted through the mounting hole 44 and screwed into the threaded hole 36 in the base 14. The location and orientation of the latch assembly 32 is controlled by the positioning of the pivot pin 34 and the threaded hole 36, thus eliminating the need to make any adjustment during assembly of the disc drive data storage device 10.

Figure 6A:
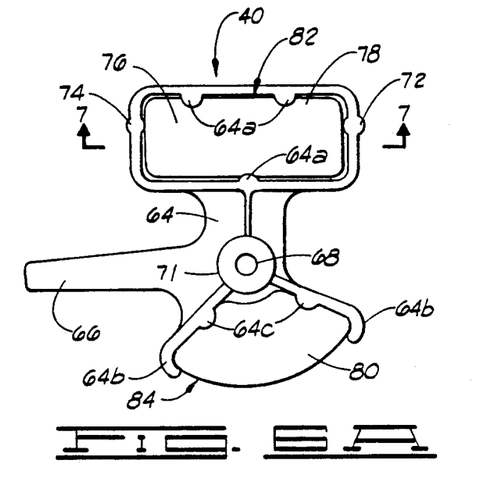
FIGS. 6A and 6B are plan and side views, respectively, of the magnet latch assembly of FIGS. 2 and 3.
Figure 6B:
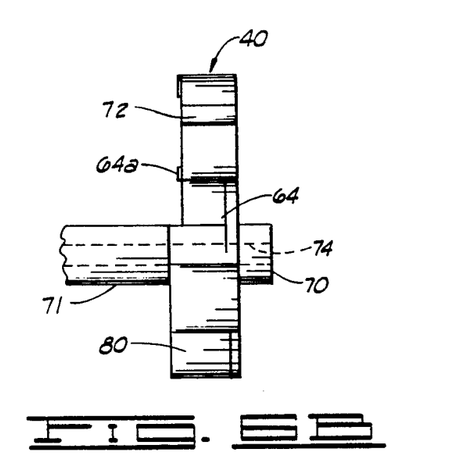

Referring now to FIGS. 6A and 6B, plan and side views, respectively, of the magnet latch assembly 40 of the latch assembly 32 are shown. The magnet latch assembly 40 comprises a housing 64 having a latch arm 66; a pivot hole 68; bosses 70 and 71 extending from opposite sides thereof (with the pivot hole 68 therethrough); and limit contact points 72, 74. When the actuator 24 is in the parking zone 30, the latch arm 66 is the member which restrains the movement of the actuator 24, as will be explained below. The housing 64 is made of a non-magnetic material, preferably a polymeric, or plastic, material.

The magnet latch assembly 40 further comprises a permanent magnet 76; a top piece 78; and a counterweight 80. The permanent magnet 76 is mounted below the top pole piece 78 and both are set in a magnet cavity 82 formed at one end of the housing 64, as shown, and secured therein by a plurality of tabs 64a. When set in the housing 64, the permanent magnet 76 and the top pole piece 78 are disposed against the inner surfaces of the two limit contact points 72, 74, portions of which extend into the magnet cavity 82. The limit contact points 72, 74 are operably cylindrically shaped features formed in the housing 64, and are disposed to contact the limit stops 52, 54 as discussed below.

The counterweight 80 is shaped to be received in a counterweight cavity 84 formed between outstanding members 64b at the other end of the housing 64; the extremities of the members 64b are shaped to springingly grasp the counterweight 80, and tabs 64c are formed above it to secure the counter weight 80 within the counterweight cavity 84. The weight of the counterweight 80 is selected such that the pivot hole 68 of the housing 64 is disposed at the center of gravity of the magnet latch assembly 40. The counterweight 80 is provided to resist rotational movement of the magnet latch assembly 40 about the pivot hole 68 that can result from mechanical shock or vibration applied in the horizontal plane of FIG. 6A. The pivot hole 68, through the boss 70, serves to properly position and align the magnet latch assembly 40 with the magnetic coil assembly 38 on the pivot pin 34. Thus, the magnet latch assembly 40 is thereby supported to rotate about the pivot pin 34 when the magnet latch assembly 40 and the magnet coil assembly 38 are assembled together in the manner discussed below.

Figure 7:
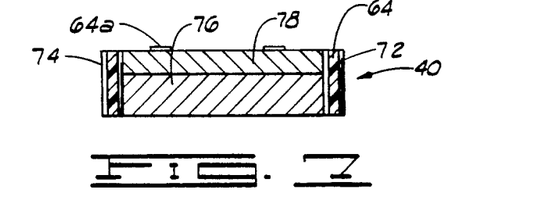
FIG. 7 is a sectional view taken on section lines 7—7 of FIG. 6A.

FIG. 7 is a sectional view of the housing 64, the permanent magnet 76 and the pole piece 78 of the magnet latch assembly 40 taken along line 7—7 in FIG. 6A. The permanent magnet 76 is a 2-pole, single piece magnet magnetized in opposite polarities on its left and right ends. A similar polarity configuration can be obtained using two separate single pole magnets. The permanent magnet 76 is below, and in contact with, the top pole piece 78, the top pole piece 78 constructed of steel or other magnetically permeable material. The permanent magnet 76 and the top pole piece 78 are dimensioned so as to be in contact with the inner surfaces of the two limit contact points 72, 74.

Figure 8:
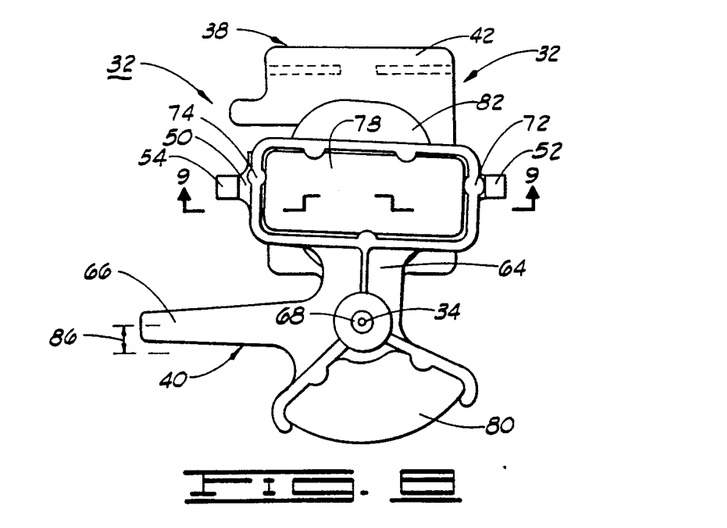
FIG. 8 is a plan view of the magnet coil assembly of FIGS. 5A and 5B and the magnet latch assembly of FIGS. 6A and 6B assembled together in accordance with the present invention.
Figure 9:
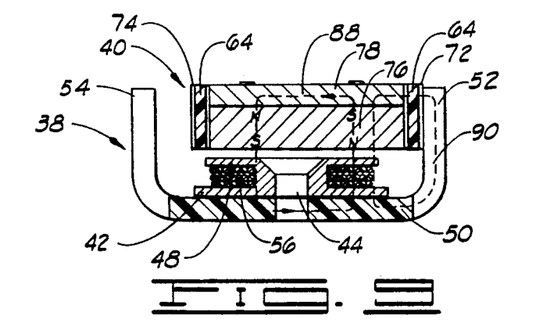
FIG. 9 is a sectional view taken on section lines 9—9 of FIG. 8.

FIG. 8 is a plan view showing the magnet coil assembly 38 an the magnet latch assembly 40, as assembled together. After the magnet coil assembly 38 has been secured to the base 14 as described above, the magnet latch assembly 40 is mounted on the magnet coil assembly 38 with the pivot pin 34 extending through the pivot hole 68 in the housing 64 so that the permanent magnet 76 and the top pole piece 78 are positioned above the coil form 48 but without being in contact therewith (as depicted in FIG. 9). The distance between the permanent magnet 76 and the coil form 48 is determined by the length of the boss 70. The magnet latch assembly 40 is held in position by the magnetic attraction between the permanent magnet 76 and the lower pole piece 50. As previously mentioned, the pivot hole 68 of magnet latch assembly 40 is dimensioned so that the magnet latch assembly 40 is free to rotate on the pivot pin 34.

FIG. 8 shows the magnet latch assembly 40 in its most clockwise position with the outer surface of the first limit contact point 72 against the right limit stop 52. This position is one of two stable positions for the magnet latch assembly 40. The other stable position of the magnet latch assembly 40 is when the magnet latch assembly 40 is in its most counterclockwise position with the outer surface of the second limit contact point 74 against the left limit stop 54. For purposes of this discussion, the most clockwise position will be referred to as the "unlocked" (or "unlatched") position, while the most counterclockwise position will be referred to as the "locked" (or "latched") position. As the magnet latch assembly 40 rotates counterclockwise from the unlocked to the locked position, the latch arm 66 moves through an arc 86. This movement of the latch arm 66 causes the latch arm 66 to engage with the actuator 24 to latch the actuator 24 in the parking zone 30 in the manner to be explained below.

The magnet latch assembly 40, pivotally supported by the magnet coil assembly 38, can selectively engage the actuator 24 to lock it in the park position 30, or in the alternate, the magnet latch assembly 40 can be rotated so as to be in clearing relationship to the actuator 24 to permit free travel thereof. That is, the magnet latch assembly 40 has a first stable position and a second stable position. As shown in FIGS. 8 and 9, the magnet latch assembly 40 is in its first stable position in magnetic attraction, or attachment, to the first limit stop 52, in which position the magnet latch assembly 40 disengages the actuator 24. The second stable position of the magnet latch assembly 40 is that in which it is in magnetic attraction, or attachment, to the second limit stop 54, in which position the magnet latch assembly 40 is disposed to lock the actuator 24.

The force necessary to move the magnet latch assembly 40 from the unlocked position to the locked position and vice versa is derived by directing a DC current pulse through the coil 56. Current applied in a first direction will generate a magnetic field to cause the magnet latch assembly 40 to rotate in a clockwise direction into the unlocked position, while reversing the direction of the current will cause the magnet latch assembly 40 to rotate in a counterclockwise direction into the locked position. The magnetic flux path which hods the magnet latch assembly 40 in these positions when current is removed from the coil 56 will be described below.

When the magnet latch assembly 40 is in the unlocked position, as illustrated in FIG. 8, the proximity of the permanent magnet 76 and top pole piece 78 to the right limit stop 52 is controlled by the dimension of the right limit contact point 72. The magnitude of the magnetic attractive force between two objects is inversely proportional to the square of the distance between the two objects. This means that, as the distance between two objects is halved, the magnetic attraction between the objects becomes four times as great. Thus, the magnetic attraction can be controlled if the distance between the objects is controlled. FIG. 8 shows that the diameter of the first limit contact point 72 is greater than the diameter of the second limit contact point 74. The result of this is that the permanent magnet 76 is positioned closer to the limit stop 54 (when the magnet latch assembly 40 is in the locked position) than it is to the limit stop 52 (when the magnet latch assembly 40 is in the unlocked position). Consequently, less force is required to lock the magnet latch assembly 40 than is required to unlock the magnet latch assembly 40; that is, less force is required to move the magnet latch assembly 40 away from the limit stop 52 (where it is in the unlocked position) than that which is required to move the magnet latch assembly 40 away from the limit stop 54 (where it is in the locked position).

Obviously, if the diameters of the two limit contact points 72, 74 were identical, the holding force in the two directions would also be identical. A situation when differing holding forces would be desirable is readily envisioned. The magnet latch assembly 40 is moved from the locked position to the unlocked position only when the head disc assembly 16 is being powered up, so an adequate amount of power to unlock the magnet latch assembly 40 is assured. Furthermore, additional holding force in the locked position insures that the latch assembly 32 is not inadvertently unlocked (e.g., by applied mechanical shock or vibration) when the head disc assembly 16 is unpowered. Conversely, when power to the head disc assembly 16 is discontinued, the only available source of power to move the actuator 24 to the parking zone 30 and to lock the magnet latch assembly 40 is derived from the back EMF of the spindle motor 20, a source which is limited in both quantity and time. Therefore, weakening the relative holding force of the magnet latch assembly 40 in the unlocked position will insure that the deteriorating back EMF of the spindle motor 20 is adequate to park the actuator 24 and to lock the magnet latch assembly 40. If different holding forces in the two stable positions of the latch assembly 32 are not needed, then the diameter of the two limit contact points 72, 74 would be identical.

Referring now to FIG. 9, a sectional view of the magnet coil assembly 38 and the magnet latch assembly 40 taken along line 9—9 in FIG. 8 is shown. Again, the magnet latch assembly 40 is shown in the unlocked position. In the unlocked position, the permanent magnet 76 and the top pole piece 78 are attracted as close to the right limit stop 52 as is permitted by the dimension of the first limit contact point 72. As described above, the spacing between the permanent magnet 76 and the top of the coil form 48 is maintained by the length of the boss 70 of the housing 64. With the magnet latch assembly 40 in the unlocked position, a north-to-south main flux path 88 exists. The main flux path 88 passes from right to left in the top pole piece 78, downward through the left end of the permanent magnet 76, left to right through the lower pole piece 50, upward through the right end of the permanent magnet 76, and back to the top pole piece 78. A secondary flux path 90 also exists, passing left to right in the top pole piece 78, downward through the right limit stop 52, right to left in the lower pole piece 50, upward through only the right end of the permanent magnet 76, and back to the top pole piece 78.

This secondary flux path 90, with a holding force controlled by the distance between the permanent magnet 76 and the right limit stop 52 (which is determined by the diameter of the first limit contact point 72), provides the magnetic force which holds the magnet latch assembly 40 in the unlocked position when no current is flowing in the coil 56. A similar secondary flux path (not shown) would exist in the left end of the permanent magnet 76 and the left limit stop 54 when the magnet latch assembly 40 is in the locked position. Thus, the unlocked and locked positions of the magnet latch assembly 40 are both stable positions. Any other position of the magnet latch assembly 40 is unstable, and therefore, the magnet latch assembly 40 tends to move toward one of the two stable positions.

FIG. 9 also shows the relationship between the coil 56 and the permanent magnet 76. In a manner well known in the art, DC current passed through the coil 56 in a first direction will create a magnetic flux field around the coil 56 which will interact with the flux field of the permanent magnet 76 and move the magnet latch assembly 40 to the unlocked position, while current applied in the opposite direction will move the magnet latch assembly 40 to the locked position. The only requirement is that sufficient current be applied to overcome the existing secondary flux path and friction which holds the magnet latch assembly 40 in its stable positions. This current requirement is controlled by the proximity of the permanent magnet 76 to the limit stops 52, 54 as determined by the diameters of the limit contact points 72, 74 in the manner described above.

Figure 10:
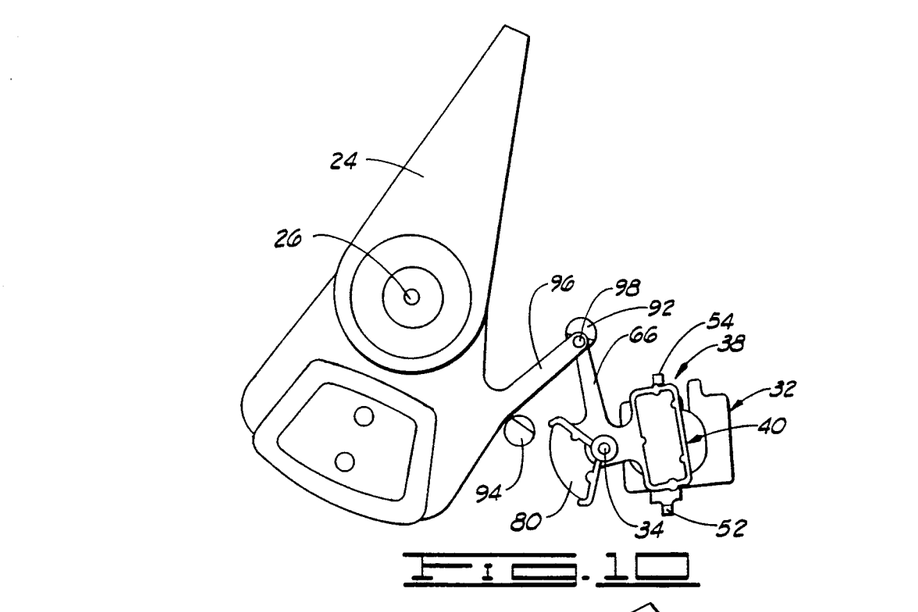
FIG. 10 is a diagrammatic plan view showing the actuator body and the latch assembly in the locked position in accordance with the present invention.
Figure 11:
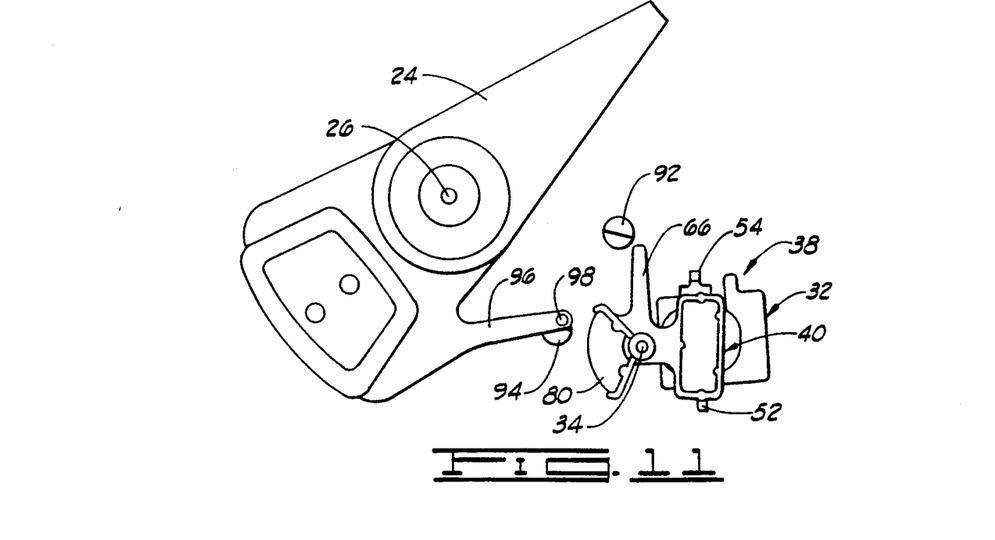
FIG. 11 is a diagrammatic plan view showing the actuator body and the latch assembly in the unlocked position in accordance with the present invention.

FIGS. 10 and 11 are diagrammatic plan views of the actuator 24 and the latch assembly 32, showing how the magnet latch assembly 40 latches and unlatches the actuator 24. The actuator 24 is rotated about the pivot shaft 26 by an actuator motor (not shown) within the limit defined by two travel stops 92, 94. The parking zone 30 of the actuator 24 is defined as the most counterclockwise position thereof, as depicted in FIG. 10. As shown in FIG. 10, the actuator 24 has a latch pin arm 96, the latch pin arm 96 supporting a latch pin 98. As the actuator 24 rotates about the pivot shaft 26, the latch pin 98 rotates between the travel stops 92, 94. In the parking zone 30, the latch pin 98 contacts the stationary travel stop 92, stopping further travel in its counterclockwise travel. As described above, the magnet latch assembly 40 and its latch arm 66 rotate about the pivot pin 34. When the actuator 24 is in the parking zone 30 (the magnet latch assembly 40 is in the locked position), the end of the latch arm 66 is positioned so that the latch pin 98 is confined between the end of the latch arm 66 and the travel stop 92, thereby locking the actuator 24 in the parking zone 30. When the magnet latch assembly 40 (and its latch arm 66) is rotated about the pivot pin 34 to the unlocked position as shown in FIG. 11, the latch arm 66 is rotated away from the proximity of the travel stop 92 so that it no longer confines the latch pin 98, and the actuator 24 is freed to rotate within its normal range, the limit in the clockwise direction being determined by the travel stop 94, as shown.

Although a rotary actuator has been shown herein describing the present invention, it will be clear that the self-holding latch assembly of the present invention can be adapted for use with a linear actuator and can engage a portion of the actuator as required to secure same in a locked position.

It will be clear that the present invention is well adapted to carry out the objects and attain the advantages mentioned as well as those inherent therein. While a presently preferred embodiment of the invention has been described for the purposes of this disclosure, numerous changes can be made which will readily suggest themselves to those skilled in the art and which are encompassed within the spirit of the invention disclosed and as defined in the appended claims.

What is claimed is:

1. A self-holding latch assembly for a disc drive storage device having a base supporting a rotatable storage disc and a movable actuator for supporting a head for recording and retrieving data on the storage disc, the latch assembly comprising:

magnet coil means, supported in a spatial relationship to the actuator and having a first magnetically permeable limit stop and a second magnetically permeable limit stop, for providing alternately directed magnetic flux in response to current directed therethrough; and magnet latch means pivotally supported by the magnet coil means for selectively disengaging the actuator when the magnet latch means is in a first stable position against the first limit stop so as permit travel of the actuator, and for selectively engaging the actuator when the magnet latch means is in a second stable position against the second limit stop so as to lock the actuator in a predetermined park position; and wherein the magnet latch means is attracted to one of the first stable position and the second stable position when current is removed from the magnet coil means by a secondary magnetic flux passed through the first limit stop and the second limit stop, respectively, and wherein the magnetic latch means is movable between the first stable position and the second stable position in response to current flow directed through the magnet coil means.

2. The self-holding latch assembly of claim 1 wherein the magnet coil means comprises:

coil means for generating a magnetic field when electrical current is passed therethrough, the magnetic field causing the magnet latch means to alternately rotate to one of the first limit stop and the second limit stop, the direction of rotation determined by the direction of electrical current therethrough.

3. The self-locking latch assembly of claim 2 wherein the magnet latch means comprises:

a housing member supported for pivotation between the first and second limit stops; and a magnet member supported by the housing member for alternate magnetic attachment to the first and second limit stops to place the magnet latch means in the first stable position and in the second stable position, respectively.

4. The self-holding latch assembly of claim 3 wherein the housing member has a latch arm extensive therefrom which is disposed to engage the actuator so that the actuator is locked when the magnetic latch means is in the second stable position.

5. The self-holding latch assembly of claim 4 further comprising:

an actuator arm extensive from the actuator and having a latch pin; and a travel stop member supported by the base and disposed so that the latch pin is brought into engagement with the travel stop member when the actuator is disposed in the park position, and wherein the latch arm is disposed so that the latch pin is confined between the travel stop and the latch arm when the latch means is in the second stable position.

6. A self-holding latch assembly for a disc drive storage device having a base supporting a rotatable storage disc and a movable actuator for supporting a head for recording and retrieving data on the data storage disc, the latch assembly comprising:

magnet coil means supported in spatial relationship to the actuator for alternately providing magnetic attraction to a first stable position and magnetic attraction to a second stable position in response to current flow directed therethrough, the magnet coil means comprising:
  a first limit stop; and
  a second limit stop;
magnet latch means pivotally supported by the magnet coil means for selectively engaging and locking the actuator in a predetermined park position, and for selectively disengaging the actuator to permit travel thereof, the latch means being magnetically responsive to the magnet coil means and disposable thereby the selectively assume one of the first stable position and the second stable position, the latch means locking the actuator in the second stable position and the latch means disengaging the actuator in the first stable position, the magnet latch means comprising:
  a housing member supported for pivotation between the first and second limit stops, the housing member having a latch arm extensive therefrom which is disposed to engage the actuator so that the actuator is locked when the magnetic latch means is in the second stable position, the magnet member being magnetically attached to the second limit stop in the second stable position;
  a magnet member supported by one end of the housing member for alternate magnetic attachment to the first and second limit stops to place the magnet latch means in the first stable position and in the second stable position, respectively; and
  a counterweight member supported by the opposing end of the housing member, the housing member being dimensioned such that the housing member, the magnet member and the counterweight member are balanced about the pivotal center of the magnet latch means;
the magnet coil means further comprising:
  coil means for generating a magnetic field when electrical current is passed therethrough, the magnetic field causing the magnet latch means to alternately rotate to the first limit stop and to the second limit stop, the direction of rotation determined by the direction of electrical current therethrough, the first and second limits stops determining the first and second stable positions, respectively;
an actuator arm extensive from the actuator and having a latch pin; and
a travel stop member supported by the base and disposed so that the latch pin is brought into engagement with the travel stop member when the actuator is disposed in the park position, and wherein the latch arm is disposed so that the latch pin is confined between the travel stop and the latch arm when the latch means is in the second stable position.

7. The self-holding latch assembly of claim 6 wherein the magnet coil means further comprises:
  a lower pole piece forming the first limit stop and the second limit stop, such first limit stop and second limit stop being upwardly turned, spaced apart members; and
  an upper pole piece supported on the magnet member and extending thereacross.

8. The self-holding latch assembly of claim 7 wherein the housing member comprises first and second limit contact points extending from opposing ends of the housing member, the first and second contact points disposed to contact the first and second limit stops, respectively, the first and second limit contact points dimensioned so that the magnet is disposed a predetermined distance from the first and second limit stops when the magnet member is magnetically attached thereto.

9. The self-holding latch assembly of claim 7 wherein the sizes of the first and second limit contact points are predetermined as being of different dimensions so that the magnetic attraction between the magnet member and the first limit stop and between the magnet member and the second limit stop are not equal.

* * * * *